United States Patent
Schoonover

(10) Patent No.: US 9,920,856 B2
(45) Date of Patent: Mar. 20, 2018

(54) METHOD FOR DETERMINING AMPLITUDE OF STICK-SLIP ON A VALVE ASSEMBLY AND IMPLEMENTATION THEREOF

(71) Applicant: Dresser, Inc., Addison, TX (US)

(72) Inventor: Larry Gene Schoonover, Falmouth, MA (US)

(73) Assignee: Dresser, Inc., Addison, TX (US)

( * ) Notice: Subject to any disclaimer, the term of this patent is extended or adjusted under 35 U.S.C. 154(b) by 784 days.

(21) Appl. No.: 14/506,047

(22) Filed: Oct. 3, 2014

(65) Prior Publication Data

US 2015/0276087 A1 Oct. 1, 2015

Related U.S. Application Data

(63) Continuation-in-part of application No. 14/231,505, filed on Mar. 31, 2014.

(60) Provisional application No. 62/049,287, filed on Sep. 11, 2014.

(51) Int. Cl.
*F16K 37/00* (2006.01)
*G05B 19/44* (2006.01)
*G05B 23/02* (2006.01)

(52) U.S. Cl.
CPC .......... *F16K 37/0083* (2013.01); *G05B 19/44* (2013.01); *G05B 23/0235* (2013.01); *G05B 2219/25232* (2013.01); *G05B 2219/33326* (2013.01); *G05B 2219/41154* (2013.01);
(Continued)

(58) Field of Classification Search
None
See application file for complete search history.

(56) References Cited

U.S. PATENT DOCUMENTS 5,719,788 A 2/1998 Seborg et al.
5,750,879 A 5/1998 Ohtsuka et al.
(Continued)

FOREIGN PATENT DOCUMENTS

EP 1441266 A2 7/2004
EP 1776622 4/2007
(Continued)

OTHER PUBLICATIONS

Zabiri "Optimization of Neural Network Model Structures for Valve Stiction Modeling", 2009 IEEE, pp. 193-197.*
(Continued)

*Primary Examiner* — Van Nguyen
(74) *Attorney, Agent, or Firm* — Paul Frank + Collins P.C.

(57) ABSTRACT

A method for processing operating data (e.g., position, setpoint, and pressure) for a valve assembly. The method is configured to associate characteristics of operation for the valve assembly with a root cause and/or a contributing factor. In one embodiment, the method can assign a first amplitude with a value that quantifies movement or "jump" of the valve stem that results from stick-slip on the valve assembly. The method can also assign a second amplitude with a value that quantifies a change in the data for the setpoint. The method can further ascertain the relationship or "position" of the first amplitude relative to the second amplitude, or vice versa. The method can use the relationship between the first amplitude and the second amplitude to indicate the root cause of the operation of the valve assembly.

13 Claims, 9 Drawing Sheets

(52) U.S. Cl.
CPC .............. *G05B 2219/41304* (2013.01); *G05B 2219/41311* (2013.01); *G05B 2219/45006* (2013.01)

(56) References Cited

U.S. PATENT DOCUMENTS

| | | | |
|---|---|---|---|
| 6,272,401 B1* | 8/2001 | Boger | F15B 5/006 700/282 |
| 6,453,261 B2* | 9/2002 | Boger | F15B 5/006 702/138 |
| 6,497,205 B2 | 12/2002 | Kumaki et al. | |
| 6,722,625 B2* | 4/2004 | Blomberg | F16K 29/00 251/129.01 |
| 6,745,084 B2* | 6/2004 | Boger | F15B 5/006 700/13 |
| 6,745,107 B1 | 6/2004 | Miller | |
| 7,089,086 B2 | 8/2006 | Schoonover | |
| 7,405,917 B2* | 7/2008 | Ahrens | F16K 31/06 324/418 |
| 7,478,012 B2 | 1/2009 | Tewes et al. | |
| 7,542,876 B2 | 6/2009 | Singhal et al. | |
| 7,797,082 B2 | 11/2010 | Srinivasan et al. | |
| 7,865,334 B2 | 1/2011 | Singhal et al. | |
| 8,145,328 B2 | 3/2012 | Choudhury et al. | |
| 9,429,938 B2* | 8/2016 | Selvaraj | G05B 19/0428 |
| 9,695,956 B2* | 7/2017 | Gattu | F15B 19/005 |
| 2001/0032518 A1* | 10/2001 | Boger | F15B 5/006 73/861 |
| 2007/0288103 A1* | 12/2007 | Choudhury | G05B 23/0229 700/35 |
| 2008/0004836 A1 | 1/2008 | Tewes et al. | |
| 2010/0058880 A1* | 3/2010 | Moody | F16K 17/04 73/865.9 |
| 2011/0082665 A1 | 4/2011 | Tabaru et al. | |
| 2011/0224949 A1 | 9/2011 | Tabaru et al. | |
| 2013/0124132 A1 | 5/2013 | Kashima | |
| 2015/0032270 A1 | 1/2015 | Gattu et al. | |

FOREIGN PATENT DOCUMENTS

| | | |
|---|---|---|
| EP | 1528447 | 4/2008 |
| JP | 2003036115 A | 2/2003 |

OTHER PUBLICATIONS

Horch et al. "Detection of Valve Stiction in Integratingprocesses", 2001 IEEE, pp. 1327-1332.*

Jelali "Estimation of Valve Stiction in Control Loops Using Separable Least-Squares and Global Search Algorithms", Journal of Process Control, Science Direct, vol. 18, Issues 7-8, pp. 632-642, Aug.-Sep. 2008.

Hagglund "A Shape-Analysis Approach for Diagnosis of Stiction in Control Valves", Control Engineering Practice, Science Direct, vol. 19, Issue 8, pp. 782-789, Aug. 2011.

PCT Search Report and Written Opinion issued in connection with corresponding PCT Application No. PCT/US2014/066337 dated Aug. 31, 2015.

PCT Search Report and Written Opinion issued in connection with corresponding PCT Application No. PCT/US2015/046146 dated Nov. 25, 2015.

T. Hagglund, A Control-Loop Performance Monitor, Control Engineering Practice, Nov. 11, 1995, vol. 3, pp. 1543-1551, US.

M.A.A. Shoukat Choudhury; Detection and Quantification of Valve Stiction; Proceedings of the 2006 American Control Conference, Jun. 14-16, 2006, Minneapolis, Minnesota, US.

Frederick Wilson Wheeler et al., U.S. Appl. No. 14/231,505, filed Mar. 31, 2014.

* cited by examiner

METHOD FOR DETERMINING AMPLITUDE OF STICK-SLIP ON A VALVE ASSEMBLY AND IMPLEMENTATION THEREOF

CROSS-REFERENCE TO RELATED APPLICATIONS

The application claims the benefit of priority to U.S. Provisional Application Ser. No. 62/049,287, filed on Sep. 11, 2014, and entitled "METHOD FOR DETERMINING AMPLITUDE OF STICK-SLIP ON A VALVE ASSEMBLY AND IMPLEMENTATION THEREOF," the content of which is incorporated by reference herein in its entirety. This application is a continuation-in-part of U.S. patent application Ser. No. 14/231,505, filed on Mar. 31, 2014, and entitled "SYSTEM AND METHOD FOR DETECTING A STICK-SLIP," the content of which is incorporated by reference herein in its entirety.

BACKGROUND

The subject matter disclosed herein relates to processing of data that corresponds with operating parameters for a valve assembly, with particular discussion about methods that use this data to quantify movement of the valve stem due to stick-slip to distinguish the root cause and/or contributing factor of cycling on the valve assembly.

Process lines may include many varieties of flow controls. These process lines typically transfer fluids for use in the chemical industry, refining industry, oil & gas recovery industry, and the like. Examples of the flow controls include pneumatic and electronic valve assemblies (collectively, "valve assemblies") that regulate a flow of process fluid (e.g., gas and liquid). In conventional implementation, these valve assemblies have a number of components that work together to regulate flow of process fluid into and/or out of the process line. These components include a closure member, a seat, a valve stem, and an actuator. Examples of the closure member may embody a plug, ball, butterfly valve, and/or like implement that can contact the seat to prevent flow. In common construction, the actuator couples with the closure member (via the valve stem). The valve assembly may also incorporate a valve positioner with electrical and/or electro-pneumatic components. During operation, the valve positioner receives control signals from a controller that is part of a process control system (also "distributed control system" or "DCS"). These control signals define operating parameters for the valve assembly, namely, a position for the closure member relative to the seat. In response to the control signal, the valve positioner delivers a pneumatic signal that regulates instrument gas to pressurize the actuator in order to regulate this position.

Cycling of a valve assembly can have many root causes. At the process level, the process control system may provide setpoint instructions that oscillate back-and-forth between various levels. The valve assembly will, in turn, modulate the position of the valve stem in response to these instructions. From the device level, the valve assembly may suffer from improperly tuned components (e.g., valve positioner) and/or have some type of physical problem that can cause cycling to occur on the valve assembly. Improper tuning (and calibration) of the valve positioner, for example, may translate the setpoint instructions into the pneumatic signal incorrectly and, thus, cause the valve stem to move to improper positions. On the other hand, physical problems can frustrate operation of the mechanical components on the valve assembly. Stick-slip describes a condition, for example, that results from high static friction and/or low kinetic friction between the valve stem and the valve packing material that surrounds the valve stem. This configuration can prevent leaks from inside the valve assembly. During operation, however, stick-slip can cause internal force, i.e., pressure on the closure member, to exceed normal operating levels in order to overcome the static friction that prevents movement of the valve stem. These internal forces, while desirable to induce movement of the valve stem, can cause the valve stem to overshoot its desired position.

The process control system will attempt to correct this error. In response to overshoot, for example, the process control system often issues instructions for the valve assembly to modulate the valve stem in the opposite direction. However, it is likely that stick-slip will disrupt the movement in the opposite direction. The resulting errors will again prompt intervention from the control system to move the valve stem in the other direction. This process repeats itself, resulting in oscillation or cycling of the valve stem that can disrupt the stability of the process line as well as cause unnecessary wear on the valve assembly.

BRIEF DESCRIPTION OF THE INVENTION

This disclosure describes improvements in valve diagnostics that can more accurately distinguish cycling that is induced by process and tuning issues from cycling that is induced by stick-slip. These improvements embody methods with steps that can quantify the amplitude of movement of the valve stem because of stick-slip. These embodiments compare this stick-slip amplitude to an amplitude of other operating parameters (e.g., setpoint) of the valve assembly. In this way, the embodiments can generate an output that indicates the contributing factor of cycling on the valve assembly. As noted herein, these contributing factors can identify whether cycling occurs due to stick-slip or that cycling occurs in response to a process control, namely, modulation of a control signal by the process control system to regulate process parameters on a process line.

BRIEF DESCRIPTION OF THE DRAWINGS

Reference is now made briefly to the accompanying drawings, in which.

Figure 1:
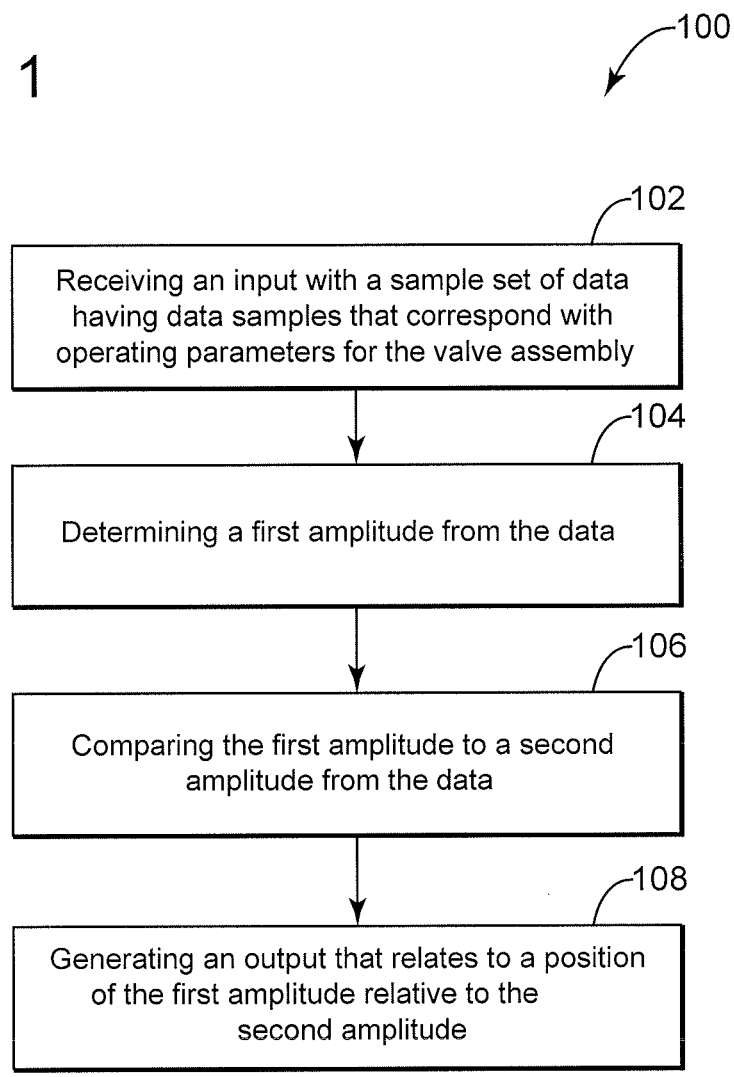
FIG. 1 depicts a flow diagram of an exemplary embodiment of a method for determining a contributing factor for cycling on a valve assembly.

Where applicable like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION

The discussion below offers a solution to determine the root cause of operating conditions on a valve assembly. Unlike previous techniques, which for the most part only detect or establish the "presence" of the operating condition, the embodiments herein can readily identify what is causing the operating condition to occur on the valve assembly. This information can enlighten the process owner/operator to better address the operating condition, effectively saving time and money by avoiding unnecessary repairs to valve assemblies that would not otherwise require maintenance.

FIG. 1 depicts a flow diagram of an exemplary embodiment of a method 100 for use on and/or as part of a valve assembly and a process control system. This diagram outlines steps that may embody instructions for one or more computer-implemented methods and/or programs. In FIG. 1, the embodiment includes, at step 102, receiving an input with a sample set of data, the sample set comprising data samples collected and/or gathered from, e.g., the valve assembly. The embodiment also includes, at step 104, determining a first amplitude for the operating parameters and, at step 106, comparing the first amplitude to a second amplitude for the operating parameters. In one implementation, the embodiment can include, at step 108, generating an output that relates to a position of the first amplitude relative to the second amplitude, namely, a relative position of the first amplitude with respect to the second amplitude. As discussed more below, in one example the first amplitude has a value that quantifies an amount of stick-slip on the valve assembly.

Broadly, the method 100 can configure the valve assembly and/or the process control system, generally, to process data in a way that associates characteristics of operation of the valve assembly with a root cause and/or a contributing factor. The data samples may correspond with operating parameters, for example, values for position, setpoint, and pressure for the valve assembly. These values are readily available and stored as part of normal operation and control of the valve assembly. In use, the method 100 can assign the first amplitude with a value that quantifies movement or "jump" of the valve stem that results from stick-slip on the valve assembly. This movement typically occurs between a first position and a second position. The method 100 can assign the second amplitude with a value that quantifies a change in the data for the setpoint and/or the position, for example, as between a first setpoint and a second setpoint. As noted above, the method 100 can ascertain the relationship or "relative position" of the first amplitude relative to the second amplitude, or vice versa. This relative position may convey that the first amplitude is greater than the second amplitude, that the first amplitude is less than the second amplitude, and/or that the first amplitude is the same as (also equal to) the second amplitude.

Notably, the present disclosure contemplates that the method 100 can use the relationship between the first amplitude and the second amplitude to indicate the root cause of the operation of the valve assembly. This relationship may, for example, indicate that stick slip is the root cause of repeated up-and-down travel of the valve stem (also, "valve stem cycling" and/or "valve cycling"). On the other hand, the relationship may indicate that abnormal or "out-of-control" process conditions on the process line are the root cause of the valve stem cycling. Such process conditions often prompt the process control system to issue the command signal in a manner that is the root cause of the valve stem cycling. The method 100 can tailor the output to provide an alert or like indicator that instructs as to the root cause. This indicator can focus the response of an end user (e.g., process owner/operator) on the problem, e.g., to avoid unnecessary repairs to the valve assembly in the event that the root cause relates to abnormal process conditions.

Figure 2:
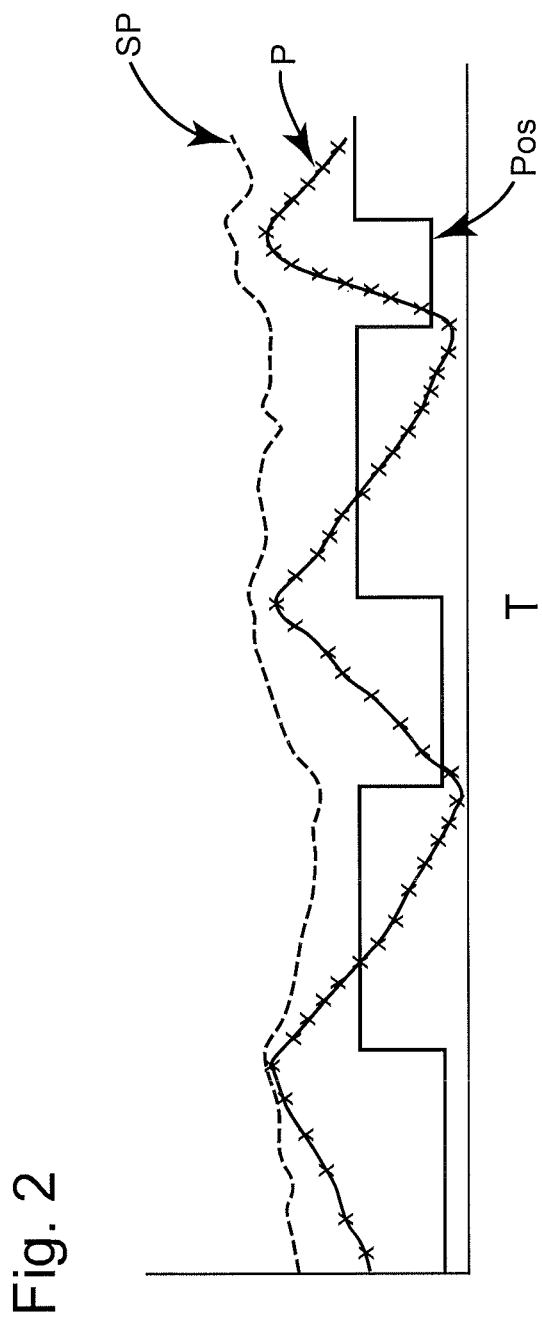
FIG. 2 depicts a plot of data that exemplifies operation of a valve assembly that exhibits cycling due to stick-slip.
Figure 3:
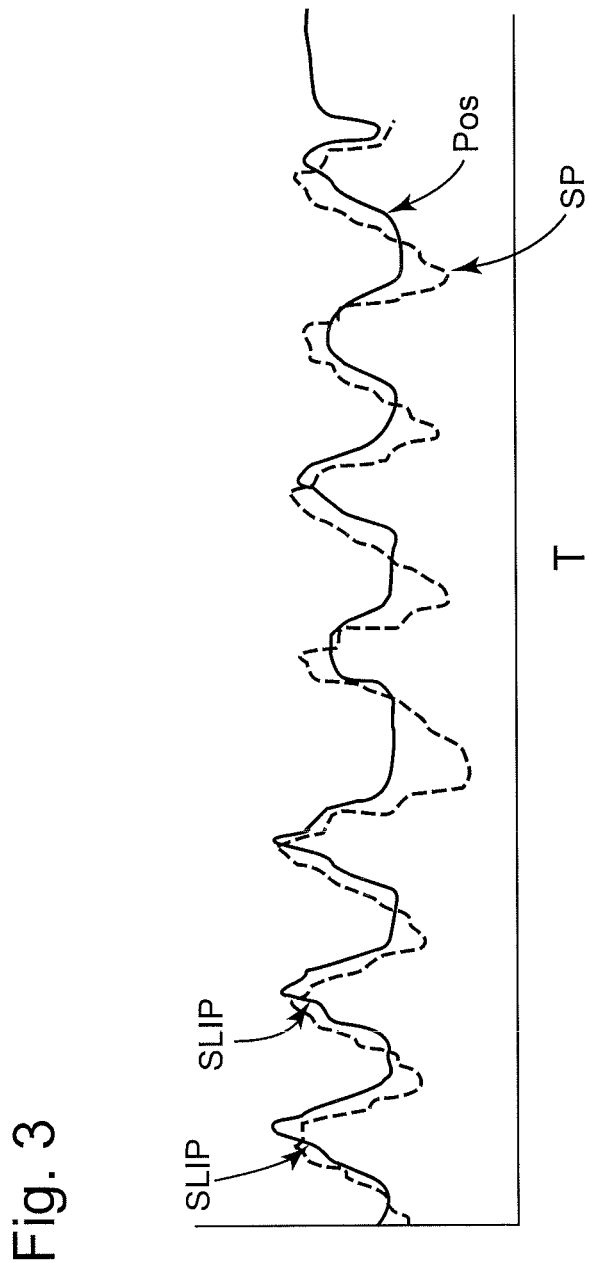
FIG. 3 depicts a plot of data that exemplifies operation of a valve assembly that exhibits cycling due to process controls.

FIGS. 2 and 3 depict plots of data for operating parameters of a valve assembly. The data reflects position POS, setpoint SP, and actuator pressure P (FIG. 2), each collected over a time scale T. In each of the plots, the valve assembly exhibits cycling of the position POS. The plot of FIG. 2 indicates operation of the valve assembly under stick-slip conditions. On the other hand, the plot of FIG. 3 indicates operation of the valve assembly that shows signs of stick-slip (as identified, generally, by SLIP), but otherwise is cycling in response to abnormal conditions on the process line.

The embodiments herein can process the data in each of FIGS. 2 and 3 to identify the root cause of operation. These embodiments can, in one example, discern stick-slip cycling that corresponds with the distinctive pattern of the position POS data in the plot of FIG. 2. This pattern has abrupt changes, or jumps, that have an amplitude that is sufficient to indicate the build-up of pressure and overshoot that occurs due to the inherent friction in the valve stem/packing interface. The embodiments can also discern that process cycling is the root cause of the pattern of position POS data in the plot of FIG. 3. In this example, while the position POS data shows some areas of stick-slip (e.g., areas SLIP), the amplitude of the jump in the position POS data is not sufficient to associate the cycling issues with stick-slip. Rather, the pattern of the position POS data overwhelmingly follows the cycling of the setpoint SP, which may occur in response to process-related issues.

Figure 4:
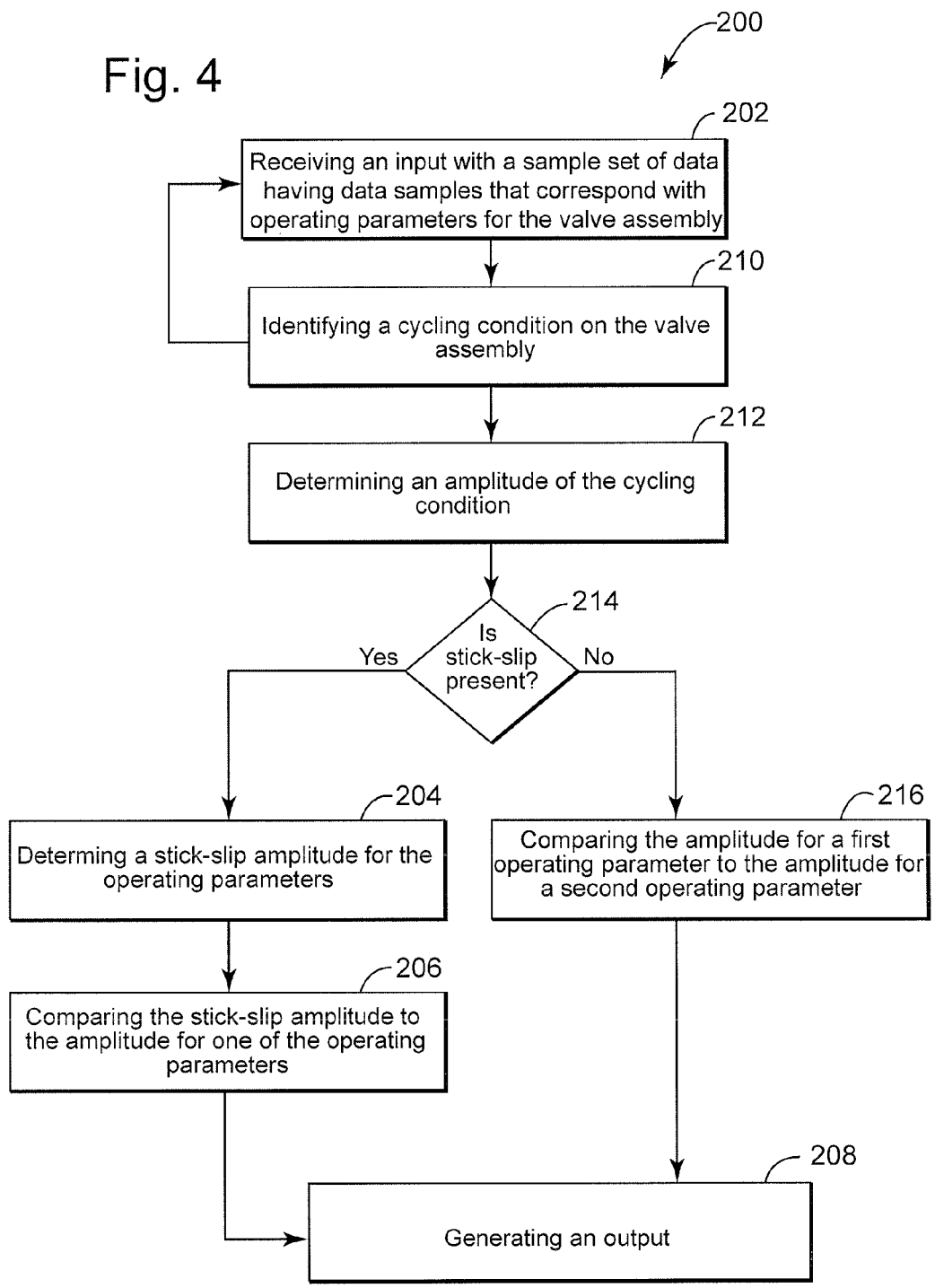
FIG. 4 depicts a flow diagram of an exemplary embodiment of a method for determining a contributing factor for cycling on a valve assembly.

FIG. 4 depicts a flow diagram for an exemplary embodiment of a method 200 that can use the stick-slip amplitude to arrive at the root cause and/or contributing factors of valve stem cycling. The method 200 includes, at step 210, identifying a cycling condition on the valve assembly, which can instruct the method 200 (to return to step 202) to continue to process data until such condition exists on the valve assembly. The method 200 also includes, at step 212, determining an amplitude of one or more of the operating parameters that exhibit the cycling condition. The method 200 further includes, at step 214, identifying a stick-slip condition on the valve assembly and/or whether a stick-slip condition is present on the valve assembly. If the stick slip condition is not present, then the method 200 continues, at step 216, comparing an amplitude for a first operating parameter ($A_1$) to an amplitude for a second operating parameter ($A_2$). On the other hand, if the stick slip condition is present, then the method 200 continues, at step 204, determining a stick-slip amplitude (as noted, for example, in the method 300 below) and, at step 206, comparing the stick-slip amplitude to the amplitude of the first operating parameter and/or the amplitude for the second operating parameter. The generated output (e.g., at step 208) can reflect the relative position of the stick-slip amplitude, the amplitude of the first operating parameter, and the amplitude of the second operating parameter, as compared to one another in context of the steps outlined above and in Table 1 below.

TABLE 1

| Example | Stick-Slip Present | Relative Position | Contributing Factor |
|---|---|---|---|
| 1 | No | $A_1 > F_1 \times A_2$ | Positioner Tuning |
| 2 | No | $A_1 < F_2 \times A_2$ | Process Control |
| 3 | Yes | $A_2 > F_3 \times A_{ST}$ | Process Control |
| 4 | Yes | $A_2 < F_4 \times A_{ST}$ | Stick-Slip |

Figure 5:
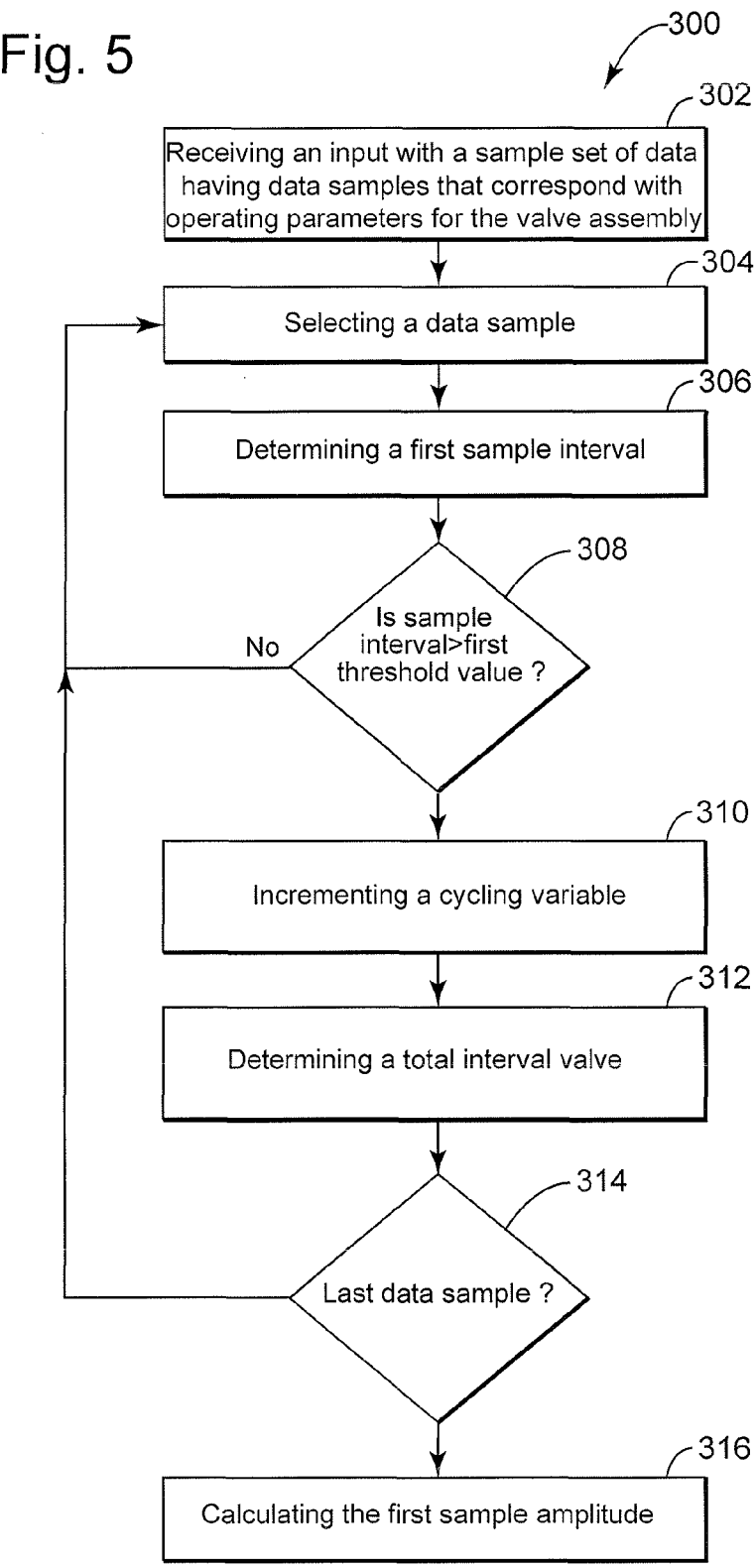
FIG. 5 depicts a flow diagram of an exemplary embodiment of a method for determining an amplitude that defines a change in position from a first position to a second position.

As noted above, the method 200 is configured to identify one or more contributing factors that cause cycling on the valve assembly. In Table 1, the amplitudes $A_1$, $A_2$, and $A_{ST}$ correspond with, respectively, the amplitude of position POS (FIGS. 2 and 3), the amplitude of setpoint SP (FIGS. 2 and 3), and the stick-slip amplitude of position POS (FIGS. 2 and 3). The configurations of the method 200 may employ one or more factors, noted in the example of Table 1 above as a first factor $F_1$, a second factor $F_2$, a third factor $F_3$, and a fourth factor $F_4$. Values for the factors $F_1$, $F_2$, $F_3$, and $F_4$ can vary as to their effect within the processing of the data, as desired. In one implementation, the factors serve to increase and/or decrease the relative value of the amplitude $A_2$ and/or $A_{ST}$, e.g., by a factor of 2, 4, 6, etc. In one example, the stick-slip amplitude is calculated in accordance with the steps outlined in the method 300 below (FIG. 5).

The steps of determining whether the stick-slip condition is present (e.g., at step 214) also analyze the data for the position POS and the setpoint SP. These steps may include, for example, determining a stick-slip condition metric, an example of which is noted in Equation (1) below, $$M_{ST} = \frac{M_P}{M_S}, \quad \text{Equation (1)}$$

in which $M_{ST}$ is the stick-slip condition metric, $M_P$ is a position metric, and $M_S$ is a setpoint metric. The method 300 can include steps for comparing the stick-slip condition metric $M_{ST}$ to a threshold criteria, which may identify a value for the ratio of the position metric $M_P$ to the setpoint metric $M_S$ that corresponds with and/or relates to stick-slip on the valve assembly. Examples of the value for the threshold criteria may be in a range from about 1 to about 3. In one implementation, if the stick-slip condition metric $M_{ST}$ does not satisfy (e.g., is greater than, less than, and/or equal to) this threshold criteria, then the stick-slip condition is not present on the valve assembly. The output can convey that stick-slip is present and/or not present on the valve assembly. In one example, the value for the first amplitude corresponds with the stick-slip condition metric being less than or equal to the value for the threshold criteria.

The method 300 can also include steps for calculating the position metric and/or the setpoint metric using "p-norm" functions, as set forth in Equations (2) and (3) below, $$M_P = \sqrt[X]{\frac{\Sigma(P_i - P_{i-1})^X}{N}}, \quad \text{Equation (2)}$$

$$M_S = \sqrt[X]{\frac{\Sigma(S_i - S_{i-1})^X}{N}}, \quad \text{Equation (3)}$$

in which $P_{i-1}$ is a first data sample for the position, $P_i$ is a second data sample for the position that is adjacent the first data sample in the sample set, $S_{i-1}$ is a first data sample for the setpoint, $S_i$ is a second data sample for the setpoint that is adjacent the first data sample in the sample set, N is a number of data samples in the sample set, and X is a p-norm parameter. Examples of the p-norm parameter can be in a range of from about 2 to about 6, but this disclosure does contemplate certain configurations of the methods herein in which the p-norm parameter falls outside of this range.

FIG. 5 illustrates a flow diagram of an exemplary embodiment of a method 300 that includes exemplary steps to arrive at values that quantify the amplitude of the "jump" shown in position (e.g., position POS of FIGS. 2 and 3). This amplitude is also referred to herein (e.g., in FIG. 4 above) as the stick-slip amplitude. These steps process the data samples in the data set; in one example, this process starts with the second data sample in the data set and ends with the last data sample in the data set. In FIG. 5, the method 300 includes, at step 302, receiving an input with the sample set of data and, at step 304, selecting a data sample from the data set. The method 300 also includes, at step 306, determining a first sample interval and, at step 308, comparing the first sample interval to a first threshold value. If the first sample interval exceeds the first threshold value, then the method 300 can include, at step 310, incrementing a cycle variable and, at step 312, determining a total interval value. In one embodiment, the method 300 includes, at step 314, determining whether the last data sample has been processed and, if so, then the method 300 can include, at step 316, calculating the first amplitude (e.g., the stick-slip amplitude ($A_{ST}$)) using the values for the total interval value and/or the count variable.

This disclosure contemplates implementation of the method 300 as an iterative process to process a plurality of data samples. In this connection, the method 300 can include steps for calculating one or more sample intervals, for example, one that occurs between data samples that are adjacent to one another in the sample set of data. The steps can also include steps for comparing each of the sample intervals to the first threshold value that relates to the position. Examples of the total interval value may be calculated by steps for adding together (and/or summing and/or aggregating) the one or more sample intervals to arrive at the total interval value. In one example, the total interval value may only include the one or more sample intervals that satisfy (also, where applicable, deviate from) the first threshold value for the data samples in the data set. This criteria may indicate that the one or more sample intervals are each greater than, less than, and/or equal to the first threshold value, as desired. In another example, the steps may include steps for incrementing the cycle variable for each of the one or more sample intervals that exceed the first threshold value. The steps may also arrive at the value for the first amplitude by incorporating one or both of the cycle variable and the total interval value, for example, where the value for the first amplitude is equal to the ratio of the total interval value to the cycle count.

The method 300 can include steps that provide a value for the first sample interval as positive and/or non-negative (and/or greater than or equal to zero). This feature is useful to calculate the amplitude of the "jump" independent of the direction of movement of the valve stem—i.e., in both the positive direction and the negative direction. In one embodiment, the method 300 may include steps to calculate the first sample interval in accordance with Equation (4) below, $$I = |P_2 - P_1| \quad \text{Equation (4)}$$

in which I is a first sample interval among the one or more sample intervals, $P_1$ is a previously-stored data sample, and $P_2$ is a data sample that is adjacent the previously-stored data sample $P_1$ in the sample set of data.

The method 300 can also include steps to generate a value for the first threshold value that, like the value for the first sample interval, is also positive and/or non-negative. This value may reflect use of a "p-norm" function. In one embodiment, the method 300 may include steps to calculate the first threshold value in accordance with Equation (5) below, $$RMP_{position} = \sqrt[X]{\frac{\Sigma(P_i - P_{i-1})^X}{N}}, \quad \text{Equation (5)}$$

in which $RMP_{position}$ is the first threshold value, $P_{i-1}$ is a first data sample for the position in the sample set, $P_i$ is a second data sample for the position that is adjacent the first data sample in the sample set, N is a number of data samples in the sample set, and X is a p-norm parameter. Examples of the p-norm parameter can be in a range of from about 2 to about 6, but this disclosure does contemplate certain configurations of the methods herein in which the p-norm parameters falls outside of this range.

Figure 6:
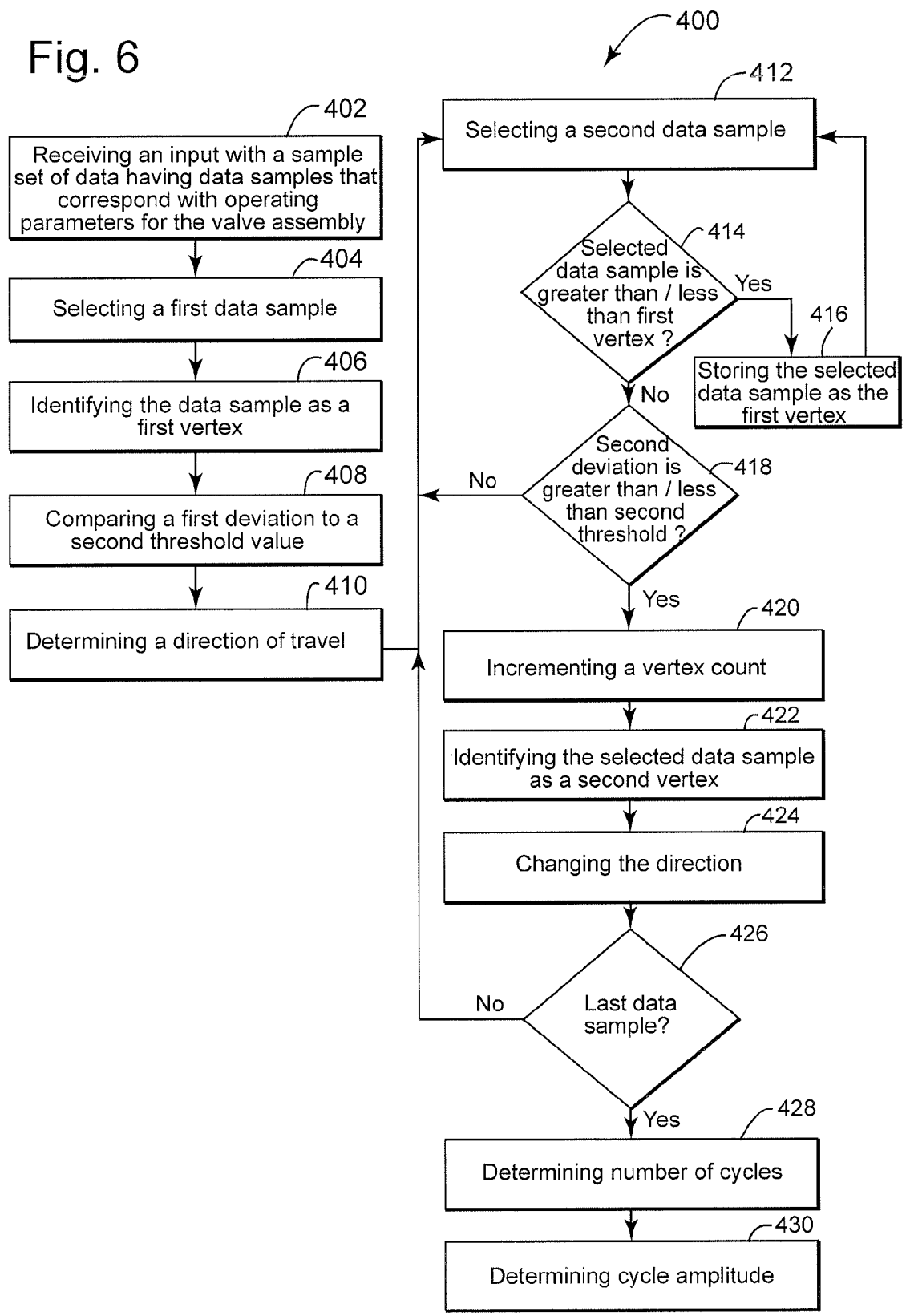
FIG. 6 depicts a flow diagram of an exemplary embodiment of a method for determining an amplitude that defines a change in setpoint from a first setpoint to a second setpoint.

FIG. 6 depicts a flow diagram of an exemplary embodiment of a method 400 with exemplary steps to determine a value for the position amplitude and the setpoint amplitude. The method 400 includes, at step 402, receiving an input with the sample set of data and, at step 404, selecting a first data sample (also "starting data sample"), for example, the first data sample among the data samples in the data set. The method 400 also includes, at step 406, identifying the starting data sample as a first vertex in the data set and, at step 408, comparing a first deviation with a second threshold value. The first deviation measures the difference between the value of the starting data sample and the value of other data samples in the data set. Notably, in one implementation, if no deviation is found in excess of the second threshold value, then the valve assembly is considered to be operating normally—i.e., the valve assembly is not cycling. On the other hand, if the first deviation is found in excess of the second threshold value, then the method 400 continues to include, at step 410, determining a direction of travel for the valve stem. The direction of travel is, typically, positive (or "increasing") for situations in which the value of the first vertex is greater than the value of the starting data sample or negative (or "decreasing") for situations in which the value of the first vertex is less than the value of the starting data sample.

The direction of travel can influence further processing of the data samples. As also shown in FIG. 6, the method 400 can include, at step 412, selecting a second data sample from the data set, often starting with a data sample that is adjacent or consecutive with the first vertex and ending with the last data sample in the data set. When the direction of travel is "increasing," the method 400 continues, at step 414, comparing the selected data sample to the first vertex. If the selected data sample is greater than the first vertex, then the method 400 includes, at step 416, storing the selected data sample as the first vertex and continues back to step 412 to select a different data sample. If the selected data sample is less than the first vertex, then the method 400 can include, at step 418, comparing a second deviation between the selected data sample and the first vertex to the second threshold value. If the second deviation is less than the second threshold value, then the method continues to include, at step 420, incrementing a vertex count that identifies each occurrence of a vertex in the sample set of data, at step 422, identifying the selected data sample as the second vertex, and, at step 424, changing the direction of travel to decreasing. In one example, the vertex corresponds with a data sample from the sample set of data that has a relative position with respect to a previously-stored data sample from the sample set of data that exceeds the second threshold value. The method 400 can continue, at step 426, determining whether the selected data sample is the last data sample in the data set. If the selected data sample is the last data sample in the data set, then the method 400 can continue to include, at step 428 and/or step 430, determining a cycle count and/or a cycle amplitude, as set forth herein. In one embodiment, the cycle amplitude corresponds with the second amplitude, which in turn may correspond with an average of the relative positions from one vertex to another vertex for the sample set of data. Thus, the method 400 may include one or more steps for storing each of the deviations (e.g., the second deviation) between the adjacent data samples.

When the direction of travel is "decreasing," then the method 400 continues, at step 414, comparing the selected data sample to the first vertex. If the selected data sample is less than the first vertex, then the method 400 includes, at step 416, storing the selected data sample as the first vertex and continues back to step 412 to select a different data sample. If the selected data sample is greater than the first vertex, the method 400 can include, at step 418, comparing the second deviation between the selected data sample and the first vertex to the second threshold. If the second deviation is greater than the second threshold value, then the method continues to include, at step 420, incrementing a vertex count that identifies each occurrence of a vertex in the sample set of data. The method 400 also includes, at step 422, identifying the selected data sample as the first vertex, and, at step 424, changing the direction of travel to increasing. The method 400 can continue to include, at step 426, determining whether the selected data sample is the last data sample in the data set. If the selected data sample is the last data sample in the data set, then the method 400 can continue to include, at step 428 and/or step 430, determining a cycle count and/or determining a cycle amplitude, as set forth herein.

Figure 7:
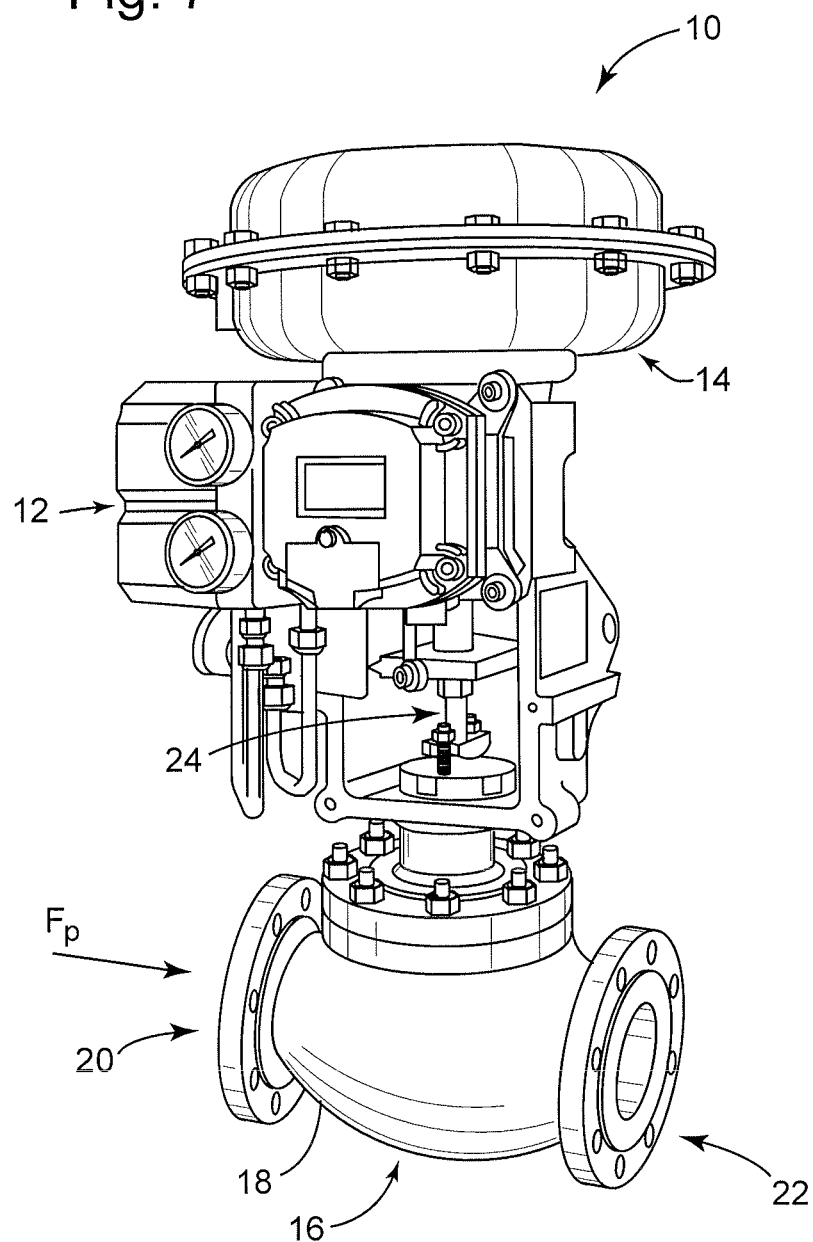
FIG. 7. depicts a perspective view of an example of a valve assembly.
Figure 8:
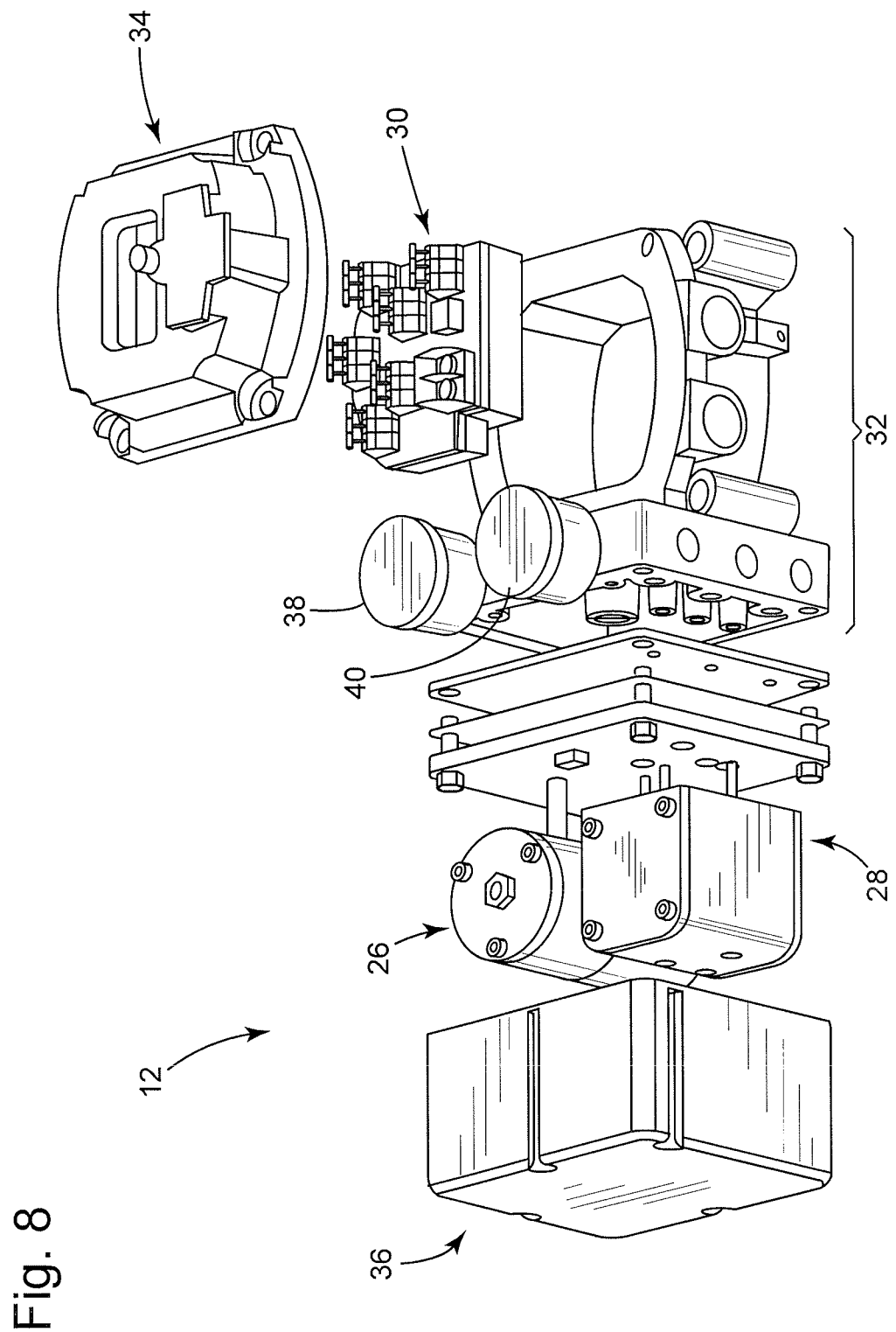
FIG. 8 depicts an exploded assembly view of an example of a valve positioner for use on the valve assembly of FIG. 7.
Figure 9:
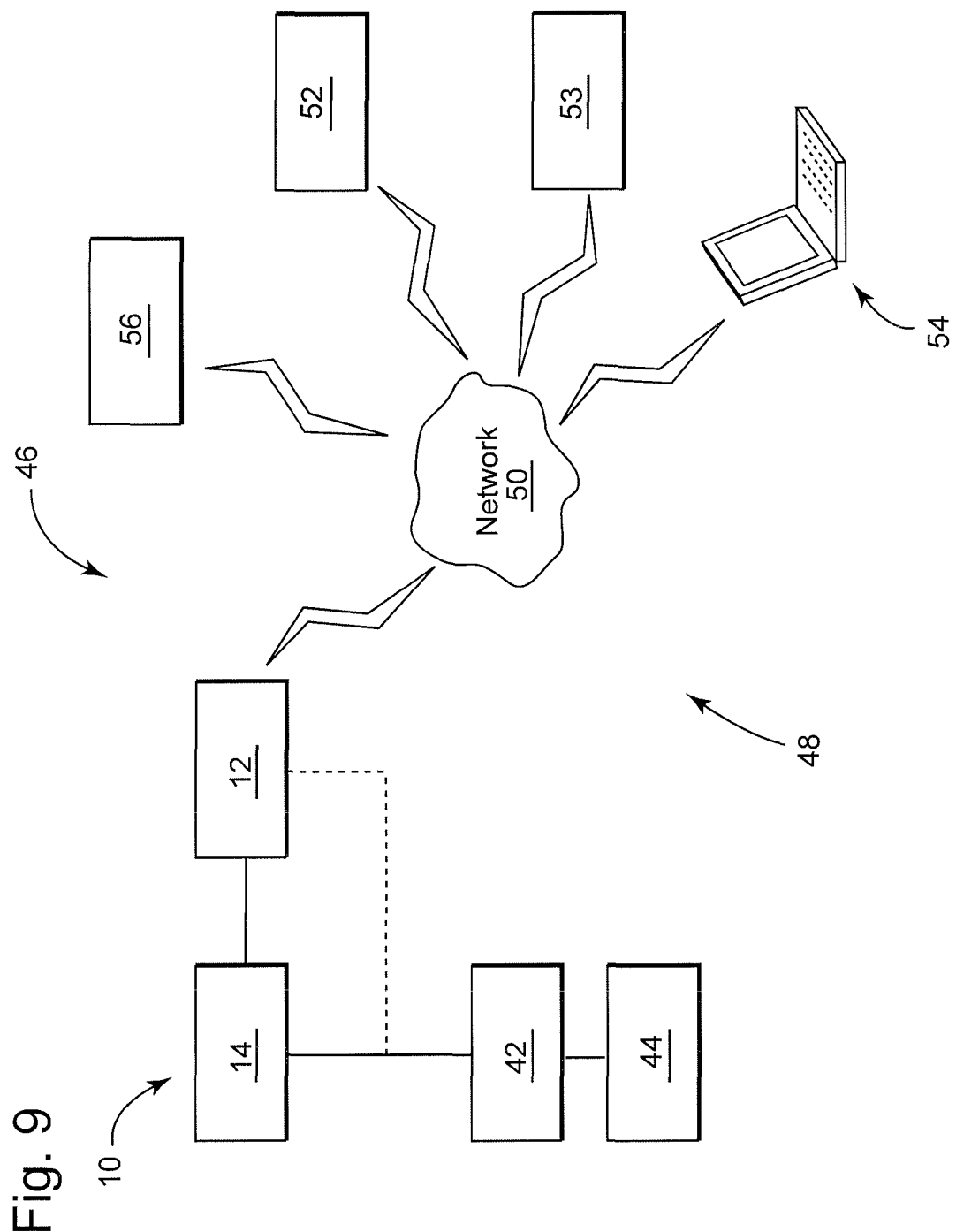
FIG. 9 depicts a schematic diagram of the valve assembly of FIG. 7 as part of a process control system.

FIGS. 7, 8, and 9 depict an example of a valve assembly and a process control system (FIG. 9) that can employ the embodiments disclosed herein. These examples are useful to regulate process fluids in industrial process lines typical of industries that focus on chemical production, refining production, and resource extraction. FIG. 7 shows a perspective view of a valve positioner. FIG. 8 provides an exploded assembly view of components of the valve assembly. FIG. 9 illustrates a schematic diagram of the valve assembly 10 as part of a process control system.

In FIG. 7, the valve assembly 10 includes a valve positioner 12, an actuator 14, and a fluid coupling 16 with a body 18 that has a first inlet/outlet 20 and a second inlet/outlet 22. The fluid coupling 16 can also include a valve stem 24, which couples the actuator 14 with other valve members (e.g., a closure member) that is found in the interior to the body 18 and, thus, not shown in the present view. This structure can modulate a flow of process fluid $F_P$ between the inlet/outlets 20, 22. During operation, the valve positioner 12 regulates instrument gas (also, "pneumatic signal") into the actuator 16 to manage the position of the valve members disposed in the body 18. The change in position modulates flow of the process fluid $F_P$ across the inlet/outlets 20, 22.

FIG. 8 depicts the valve positioner 12 in exploded form. As noted above, the valve positioner 12 has components that generate the pneumatic signal to the actuator 14 (FIG. 7). The valve positioner 12 can have a plurality of positioner components (e.g., a converter component 26, a relay component 28, a processing component 30). The valve positioner 12 can also have a housing 32. One or more covers (e.g., a first cover 34 and a second cover 36) can secure with the housing 32 to form an enclosure about the positioner components 26, 28, 30. This enclosure protects the positioner components from conditions that prevail in the environment surrounding the valve assembly 10. The valve positioner 12 also includes one or more gauges (e.g., a first gauge 38 and a second gauge 40) that can provide an indication of the flow conditions (e.g., pressure, flow rate, etc.) of the instrument gas that the valve positioner 12 uses to operate the valve in the valve assembly 10. In one example, operation of the positioner components 26, 28, 30 maintain the position of the valve members in the body 18 (FIG. 7) to modulate flow of the process fluid $F_P$ across the inlet/outlets 20, 22 (FIG. 7).

FIG. 9 depicts a schematic diagram of the valve assembly 10. Examples of the valve members can include a closure member 42 that can move relative to a seat 44. As also shown in FIG. 9, the valve assembly 10 integrates as part of a control system 46, typically by way of communication between the valve positioner 12 and a network system 48 via a network 50. Examples of the network 50 can transfer data, information, and signals by way of wired protocols (e.g., 4-20 mA, Foundation Fieldbus, etc.) and/or wireless protocols, many of which find use in a plant or factory automation environment. These protocols facilitate communication over the network 50 between the valve positioner 12, a process management server 52 (and like "apparatus") that can run certain diagnostic and/or operative software and programs for data analysis, a process controller 53, a terminal 54, and/or an external server 56. During operation, the process controller 53 can execute one or more computer programs to deliver a command signal to the valve positioner 12. The command signal identifies a commanded position for the closure member 42. The valve positioner 12 uses the commanded position to modulate the instrument gas to the actuator 14 and, effectively, allow the closure member 42 to move relative to the seat 44. In one example, feedback in the assembly can provide the valve positioner 12 with a position of the valve stem 14. The position corresponds with the location and/or position of the closure member 42 relative to the seat 44. In one embodiment, the process management server 52 can comprise a processor configured to access a memory that has one or more executable instructions stored thereon, the executable instructions comprising one or more instructions that configure the server 52 (also, "apparatus") and that may embody one or more of the method steps as set forth herein. The memory may be incorporated as part of the process management server 52 or, in one example, separate from the process management server 52.

The data may reside on a data source, often locally in one or more memories on the valve positioner 12 (FIG. 7), although this disclosure also contemplates configurations in which the data resides on the control system 46 (FIG. 9). For example, the data source may integrate with the process management server 52 (FIG. 9) and/or as part of the external server 56 (FIG. 9). At the data source, the data may be arranged as one or more data sets that include one or more data samples. The data sets may be identified by an indicator (e.g., a date stamp, a time stamp, a date/time stamp, etc.) that relates to the chronological time at which the data samples in the data set were gathered and/or stored, e.g., in memory. For real-time use of the methods, the data samples may be read into a buffer and/or like configured storage medium that allows for ready access to the data samples to afford the methods with chronologically relevant data, taking into consideration necessary data processing time-lag. In one embodiment, the methods may include one or more steps for obtaining and/or retrieving the data from the data source.

In view of the foregoing, the embodiments above deploy features that can determine the amplitude of jump that results from stick-slip during operation of the valve assembly. The embodiments are also configured to use this amplitude to identify the root cause or contributing factor to cycling of the valve stem. A technical effect is to trigger an alarm or an output, generally, that can alert the process owner/operator to the root cause and, thus, direct attention to specific solutions (i.e., process solutions) that can avoid unnecessary repairs and maintenance on the valve assemblies of the process line.

The embodiments may be implemented on any device where relevant data is present and/or otherwise accessible. For example, the embodiments can be implemented as executable instructions (e.g., firmware, hardware, software, etc.) on the valve positioner. The valve positioner can transmit the output of the embodiments to a distributed control system, asset management system, independent monitoring computing device (e.g., a desktop computer, laptop computer, tablet, smartphone, mobile device, etc.). In another embodiment, the embodiments can obtain data from a historian (e.g., a repository, memory, etc.), and send to an independent diagnostic computing device. The historian is conventionally connected to the asset management system or distributed control system. The diagnostic computing device has all the capabilities of the monitoring computer and, often, the additional capability to execute executable instructions for the embodiment to process the given data. In another embodiment, the valve positioner is configured to send data by wires or wirelessly to the diagnostic computing device, as well as through peripheral and complimentary channels (e.g., through intermediate devices such as a DCS or may be connected directly to the diagnostic computer).

One or more of the steps of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software).

Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for quantifying an operating condition on a valve assembly, comprising:
   receiving an input with a sample set of data having data samples that correspond with operating parameters for a valve assembly, the operating parameters comprising a position and a setpoint;
   determining a first amplitude having a value that quantifies a change in the position from a first position to a second position by
      determining a stick-slip condition metric; and
      comparing the stick-slip condition metric to a threshold criteria, wherein the threshold criteria has a value that corresponds with stick-slip on the valve assembly and wherein the value for the first amplitude indicates that the stick-slip condition metric exceeds the value for the threshold criteria;
   comparing the first amplitude to a second amplitude, the second amplitude having a value that quantifies a change in the setpoint from a first setpoint to a second setpoint; and
   generating an output that reflects a relative position of the first amplitude with respect to the second amplitude; and
   using the output, triggering an alert that corresponds with either instructions to change process parameters or instructions to perform maintenance on the valve assembly,
   wherein the stick-slip condition metric is calculated in accordance with, $$M_{ST} = \frac{M_P}{M_S},$$

wherein $M_{ST}$ is the stick-slip condition metric, $M_P$ is a position metric, and $M_S$ is a setpoint metric,
   wherein the position metric $M_P$ and the setpoint metric $M_S$ are calculated in accordance with, $$M_P = \sqrt[X]{\frac{\Sigma(P_i - P_{i-1})^X}{N}},$$

$$M_S = \sqrt[X]{\frac{\Sigma(S_i - S_{i-1})^X}{N}},$$

and
   wherein $P_{i-1}$ is a first data sample for the position, $P_i$ is a second data sample for the position that is adjacent the first data sample in the sample set, $S_{i-1}$ is a first data sample for the setpoint, $S_i$ is a second data sample for the setpoint that is adjacent the first data sample in the sample set, N is a number of data samples in the sample set, and X is a p-norm parameter.

2. The method of claim 1, further comprising:
   calculating one or more sample intervals between data samples that are adjacent to one another in the sample set of data; and
   comparing each of the sample intervals to a first threshold value that relates to the position,
   wherein the first threshold value is calculated in accordance with, $$RMP_{position} = \sqrt[X]{\frac{\Sigma(P_i - P_{i-1})^X}{N}},$$

wherein $RMP_{position}$ is the first threshold value, $P_{i-1}$ is a first data sample for the position in the sample set, $P_i$ is a second data sample for the position that is adjacent the first data sample in the sample set, N is a number of data samples in the sample set, and X is a p-norm parameter, and
   wherein the value for the first amplitude includes the sample intervals that deviate from the first threshold value.

3. The method of claim 2, further comprising:
   adding the one or more sample intervals together to arrive at a total interval value, wherein the value for the first amplitude incorporates the total interval value.

4. The method of claim 3, wherein the value for the first amplitude includes the sample intervals that are greater than the first threshold value.

5. An apparatus, comprising:
   a processor configured to access a memory that has one or more executable instructions stored thereon, the executable instructions comprising one or more instructions that configure the apparatus for
      receiving an input with a sample set of data having data samples that correspond with operating parameters for the valve assembly, the operating parameters comprising a position and a set point;
      determining a first amplitude having a value that quantifies a change in the position from a first position to a second position by,
         determining a stick-slip condition metric; and
         comparing the stick-slip condition metric to a threshold criteria, wherein the threshold criteria has a value that corresponds with stick-slip on the valve assembly and wherein the value for the first amplitude indicates that the stick-slip condition metric exceeds the value for the threshold criteria;
      comparing the first amplitude to a second amplitude, the second amplitude having a value that quantifies a change in the setpoint from a first setpoint to a second setpoint;
      generating an output that reflects a relative position of the first amplitude with respect to the second amplitude; and
      using the output, triggering an alert that corresponds with either instructions to change process parameters or instructions to perform maintenance on the valve assembly,
   wherein the stick-slip condition metric is calculated in accordance with, $$M_{ST} = \frac{M_P}{M_S},$$

wherein $M_{ST}$ is the stick-slip condition metric, $M_P$ is a position metric, and $M_S$ is a setpoint metric,
   wherein the position metric $M_P$ and the setpoint metric $M_S$ are calculated in accordance with, $$M_P = \sqrt[X]{\frac{\Sigma(P_i - P_{i-1})^X}{N}},$$

$$M_S = \sqrt[X]{\frac{\Sigma(S_i - S_{i-1})^X}{N}},$$

and
   wherein $P_{i-1}$ is a first data sample for the position, $P_i$ is a second data sample for the position that is adjacent the first data sample in the sample set, $S_{i-1}$ is a first data sample for the setpoint, $S_i$ is a second data sample for the setpoint that is adjacent the first data sample in the sample set, N is a number of data samples in the sample set, and X is a p-norm parameter.

6. The apparatus of claim 5, wherein the executable instructions include instructions that configure the apparatus for,
   calculating one or more sample intervals between data samples that are adjacent to one another in the sample set of data, and
   comparing each of the sample intervals to a first threshold value that relates to the position,
   wherein the value for the first amplitude includes the sample intervals that deviate from the first threshold value.

7. The apparatus of claim 6, wherein the executable instruction include instructions that configure the apparatus for,
   calculating the first threshold value in accordance with, $$RMP_{position} = \sqrt[X]{\frac{\Sigma(P_i - P_{i-1})^X}{N}},$$

wherein $RMP_{position}$ is the first threshold value, $P_{i-1}$ is a first data sample for the position in the sample set, $P_i$ is a second data sample for the position that is adjacent the first data sample in the sample set, N is a number of data samples in the sample set, and X is a p-norm parameter.

8. The apparatus of claim 6, wherein the executable instructions include instructions that configure the apparatus for,
   adding the one or more sample intervals together to arrive at a total interval value, wherein the value for the first amplitude incorporates the total interval value.

9. The apparatus of claim 8, wherein the value for the first amplitude includes the sample intervals that are greater than the first threshold value.

10. A valve positioner for use on a valve assembly having a closure member that moves relative to a seat, said valve positioner comprising:
   a processor;
   a memory coupled with the processor; and
   one or more executable instructions stored on the memory and configured to be executed by the processor, the executable instructions comprising one or more instructions for,
      receiving an input with a sample set of data having data samples that correspond with operating parameters for the valve assembly, the operating parameters comprising a position and a setpoint;
      determining a first amplitude having a value that quantifies a change in the position from a first position to a second position by,
         determining a stick-slip condition metric; and
         comparing the stick-slip condition metric to a threshold criteria, wherein the threshold criteria has a value that corresponds with stick-slip on the valve assembly and wherein the value for the first amplitude indicates that the stick-slip condition metric exceeds the value for the threshold criteria;
      comparing the first amplitude to a second amplitude, the second amplitude having a value that quantifies a change in the setpoint from a first setpoint to a second set point; and
      generating an output that reflects a relative position of the first amplitude with respect to the second amplitude; and using the output, triggering an alert that corresponds with either instructions to change process parameters or instructions to perform maintenance on the valve assembly, wherein the stick-slip condition metric is calculated in accordance with, $$M_{ST} = \frac{M_P}{M_S},$$

wherein $M_{ST}$ is the stick-slip condition metric, $M_P$ is a position metric, and $M_S$ is a setpoint metric,
wherein the position metric $M_P$ and the setpoint metric $M_S$ are calculated in accordance with, $$M_P = \sqrt[X]{\frac{E(P_i - P_{i-1})^X}{N}},$$

$$M_S = \sqrt[X]{\frac{E(S_i - S_{i-1})^X}{N}}, \text{ and}$$

wherein $P_{i-1}$ is a first data sample for the position, $P_i$ is a second data sample for the position that is adjacent the first data sample in the sample set, $S_{1-1}$ is a first data sample for the setpoint, $S_i$ is a second data sample for the setpoint that is adjacent the first data sample in the sample set, N is a number of data samples in the sample set, and X is a p-norm parameter.

11. The valve positioner of claim 10, wherein the executable instructions include instructions for,
   calculating one or more sample intervals between data samples that are adjacent to one another in the sample set of data, and
   comparing each of the sample intervals to a first threshold value that relates to the position,
   wherein the first amplitude includes the sample intervals that deviate from the first threshold value.

12. The valve positioner of claim 11, wherein the executable instructions include instructions for,
   adding the one or more sample intervals together to arrive at a total interval value, wherein the value for the first amplitude incorporates the total interval value.

13. The valve positioner of claim 11, wherein the executable instruction include instructions for,
   calculating the first threshold value in accordance with, $$RMP_{position} = \sqrt[X]{\frac{\Sigma(P_i - P_{i-1})^X}{N}},$$

wherein $RMP_{position}$ is the first threshold value, $P_{i-1}$ is a first data sample for the position in the sample set, $P_i$ is a second data sample for the position that is adjacent the first data sample in the sample set, N is a number of data samples in the sample set, and X is a p-norm parameter, and
wherein the value for the first amplitude includes the sample intervals that are greater than the first threshold value.

* * * * *